(12) United States Patent
Moireau et al.

(10) Patent No.: US 10,035,284 B2
(45) Date of Patent: Jul. 31, 2018

(54) UV-CURABLE GLASS FIBER SIZING COMPOSITIONS

(71) Applicant: OCV INTERLLECTUAL CAPITAL, LLC, Toledo, OH (US)

(72) Inventors: Patrick Moireau, Curienne (FR); Xavier Allonas, Mulhouse (FR); Celine Croutxe-Barghorn, Rantzwiller (FR); Remi Pynaert, Staffelfelden (FR)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 15/101,052

(22) PCT Filed: Dec. 2, 2014

(86) PCT No.: PCT/US2014/067989
§ 371 (c)(1),
(2) Date: Jun. 2, 2016

(87) PCT Pub. No.: WO2015/084753
PCT Pub. Date: Jun. 11, 2015

(65) Prior Publication Data
US 2016/0297105 A1  Oct. 13, 2016

Related U.S. Application Data

(60) Provisional application No. 61/911,098, filed on Dec. 3, 2013.

(51) Int. Cl.
*C08G 63/00* (2006.01)
*C08L 81/00* (2006.01)
(Continued)

(52) U.S. Cl.
CPC ............ *B29B 15/122* (2013.01); *B29B 11/16* (2013.01); *B29C 35/0805* (2013.01);
(Continued)

(58) Field of Classification Search
CPC ..... B29B 15/122; B29B 11/16; B29B 15/127; C08G 75/12; C08G 75/045; C03C 25/26; C03C 25/32; C03C 25/40; C08K 5/08; C08K 5/5425; C08K 5/544; B29C 35/0805; B29C 2035/0827; C08J 5/24;
(Continued)

(56) References Cited

U.S. PATENT DOCUMENTS

2005/0119366 A1   6/2005  Moy et al.
2012/0128314 A1*  5/2012  Wu ..................... C03C 25/1065
                                                         385/141

FOREIGN PATENT DOCUMENTS

DE      277081      3/1990
EP      570283      11/1993
(Continued)

OTHER PUBLICATIONS

International Search Report and Written Opinion from PCT/US2014/067989 dated Mar. 2, 2015.

*Primary Examiner* — David T Karst
(74) *Attorney, Agent, or Firm* — Calfee, Halter & Griswold LLP

(57) ABSTRACT

UV-curable glass fiber sizing compositions, glass fibers sized with a UV-curable sizing composition, sizing methods, and composites comprising such UV-curable sized glass fibers are disclosed.

21 Claims, 2 Drawing Sheets

(51) Int. Cl.
    *C04B 28/36*     (2006.01)
    *B29B 15/12*     (2006.01)
    *C08G 75/12*     (2016.01)
    *C03C 25/26*     (2018.01)
    *C03C 25/32*     (2018.01)
    *C03C 25/40*     (2006.01)
    *C08J 5/08*     (2006.01)
    *B29B 11/16*     (2006.01)
    *B29C 35/08*     (2006.01)
    *C08G 75/045*     (2016.01)
    *C08J 5/24*     (2006.01)
    *C09D 181/02*     (2006.01)
    *C09D 4/00*     (2006.01)
    *B29K 63/00*     (2006.01)
    *B29K 71/00*     (2006.01)
    *B29K 83/00*     (2006.01)
    *B29K 105/08*     (2006.01)
    *B29K 309/08*     (2006.01)
    *C08K 5/5425*     (2006.01)
    *C08K 5/544*     (2006.01)

(52) U.S. Cl.
    CPC .............. *C03C 25/26* (2013.01); *C03C 25/32* (2013.01); *C03C 25/40* (2013.01); *C08G 75/045* (2013.01); *C08G 75/12* (2013.01); *C08J 5/08* (2013.01); *C08J 5/24* (2013.01); *C09D 181/02* (2013.01); *B29B 15/127* (2013.01); *B29C 2035/0827* (2013.01); *B29K 2063/00* (2013.01); *B29K 2071/00* (2013.01); *B29K 2083/00* (2013.01); *B29K 2105/0872* (2013.01); *B29K 2309/08* (2013.01); *C08J 2363/00* (2013.01); *C08J 2481/02* (2013.01); *C08K 5/544* (2013.01); *C08K 5/5425* (2013.01); *C09D 4/00* (2013.01)

(58) Field of Classification Search
    CPC . C08J 2363/00; C08J 2481/02; C09D 181/02; C09D 4/00; B29K 2063/00; B29K 2071/00; B29K 2083/00; B29K 2105/0872; B29K 2309/08
    USPC ........ 523/435; 106/287.24, 287.32; 525/509; 524/599, 609, 612
    See application file for complete search history.

(56) References Cited

FOREIGN PATENT DOCUMENTS

| | | | |
|---|---|---|---|
| FR | 2767539 | 2/1999 | |
| FR | 2798125 | 3/2001 | |
| WO | 95/00869 | 1/1995 | |
| WO | 2004/101649 | 11/2004 | |
| WO | 2009/137197 | 11/2009 | |
| WO | WO 2010076587 A1 * | 7/2010 | ........... C03C 25/285 |

* cited by examiner

UV-CURABLE GLASS FIBER SIZING COMPOSITIONS

RELATED APPLICATIONS

This application is the U.S. national stage entry of PCT/US14/67989, filed on Dec. 2, 2014, which claims the benefit of provisional patent application no. 61/911,098, filed Dec. 3, 2013, titled "UV Curable Glass Fiber Sizing Compositions" which is incorporated herein by reference.

FIELD OF THE INVENTION

The general inventive concepts relate to UV-curable sizing compositions for glass fibers, sizing methods, and composites comprising said glass fibers.

BACKGROUND

Organic matrix composites are perhaps the most widespread composite materials. Two types of polymer resins can be used for organic matrix composites: thermosets and thermoplastics. Also a wide range of fibers, such as carbon, aramid, vegetal, and glass fibers can be used to reinforce the organic matrix of the composite material. In this respect, glass fibers are widely used.

Sizing compositions are traditionally used in the production of glass fibers to increase the manufacturing, transformation, and general processing characteristics of the glass fibers. The use of sizing compositions may further improve the performance of glass and other fibers in composite materials by increasing the compatibility of the fibers with the matrix material used in forming the composites.

Sizing compositions are thin coatings that are applied to glass fibers as the fibers are being formed. In this respect, sizing compositions differ from secondary or post-coating compositions that are applied in a process separated from the glass fiber production process. Such secondary or post-coating compositions are typically much thicker (e.g., 1,000 times n glass fiber sizings and typically have a thickness in the range of 50-200 micrometers. In contrast, the typical sizing thickness is around 50 nm and generally represents less than 1 weight % of the glass fiber.

Traditionally, the sizing compositions used to coat glass fibers are aqueous-based compositions, as either a suspension or emulsion. Such aqueous sizing compositions conventionally contain up to 90 weight % water and 10 weight % dry matter. The suspension or emulsion has a solids content that is often composed of at least a film former, a coupling agent, a lubricant, and a surfactant.

A film former may be used in a sizing composition to hold individual filaments together to form fibers, and protect the filaments from damage caused by abrasion. Traditional film formers include polyvinyl acetates, polyurethanes, modified polyolefins, polyesters epoxides, and mixtures thereof, with various molecular weights from 600 g/mol to more than 20,000 g/mol.

Sizing compositions may also include a coupling agent to enhance the adhesion of the sizing compositions with matrix material when forming a composite, to improve the composite properties. A suitable coupling agent can be an organofunctional silane.

Additional additives may be included in the sizing compositions, depending on the intended application. Such additives include, for example, anti-statics, wetting agents, anti-oxidants, and pH modifiers.

However, such aqueous sizing compositions have certain drawbacks. For example, once glass fibers are sized, the sized glass fibers are gathered into a strand and the strand is collected on a forming package. Prior to packaging, he strand must be completely dried to remove the water from the sizing composition, leaving only solids on the glass strands. To accomplish this, the glass strands are subjected to a specific temperature cycle, with temperatures up to about 150° C. The drying may take up to 24 hours and specific drying equipment is required, which requires additional capital and energy expense.

Another drawback is a phenomenon called migration, which occurs during the aforementioned drying and packaging process. Migration is the term given to the outward advance of the sizing composition from the glass fibers in the package when the package is dried. The heat from the oven causes the moisture from the sizing composition to be driven outwardly. When this occurs, some of the other sizing ingredients are carried therewith and are deposited on the outer surfaces of the forming package. This requires a stripping process to remove external migration and improve homogeneity of the glass fiber package. However, this supplementary process creates a substantial amount of waste product and further capital expense.

To resolve this issue, UV-curable sizing compositions have been proposed that include free radical photo polymerization using specific monomolecular or bimolecular photo initiating systems. Acrylate and methacrylate-based systems represent the conventional UV-curable compounds for their high reactivity. In this respect, EP 570283 A1 describes an acrylate-based system, in which a liquid UV-curable mixture is deposited on glass filaments directly after they are formed and yet before the winding step.

However, conventional UV-curable sizing compositions experience an oxygen-induced inhibition of radical polymerization. This inhibition is caused by the presence of dissolved oxygen, which establishes an induction period, reducing the polymerization rate and decreasing the final conversion. The reduction of the polymerization rate also reduces the overall polymer length and forms tacky surfaces. Glass fiber sizing compositions with a typical thickness in the nanometer-range are particularly exposed to this phenomenon.

To resolve oxygen interaction in UV-curable glass fiber sizing compositions, physical (e.g., adjusting curing conditions) and chemical solutions (e.g., additives to interact with oxygen or peroxyl radicals to regenerate initiating radicals) have been proposed.

In the field of adhesives, thiol-ene systems have been proposed to avoid inhibition by oxygen in radical based UV curing systems. In this respect, US 2005/0119366 proposes UV-curable adhesive composition comprising a vinyl-ether terminated urethane and a poly-functional mercaptan.

Thiol-ene chemistry describes the reaction of a mercaptan (RSH, thioalcohol, thiol) functional compound with various classes of unsaturated organic compounds ("ene"). When suitable reactants are combined and exposed to an appropriate UV source, the thiol-ene reaction proceeds rapidly and quantitatively, in the presence of ambient oxygen and in the absence of added photoinitiator.

However, no glass fiber sizing system has yet been proposed that avoids both the disadvantages of aqueous glass fiber sizing systems and of the conventional UV-curable glass fiber sizing compositions.

SUMMARY

The general inventive concepts are directed to a UV-curable glass fiber sizing composition that includes a polyfunctional mercaptan, a polyunsaturated alkene, and a coupling agent.

The general inventive concepts further relate to glass fibers sized with a UV-cured composition, wherein. at least 95 weight percent of the sized glass fibers is glass and no more than 5 weight percent of the sized glass fibers is the UV-cured sizing composition of the present invention.

The general inventive concepts further relate to a method of sizing glass fibers with a UV-curable sizing composition that includes preparing a UV-curable sizing composition, applying the UV-curable sizing composition to the surface of the glass fibers to form a sized glass fiber, and exposing the coated surface to UV-radiation to cure the UV-curable sizing composition.

The general inventive concepts further relate to composites comprising glass fibers sized with the UV-curable sizing composition of the present invention and a resin.

Additional features and advantages will be set forth in part in the description that follows, and in part may be obvious from the description, or may be learned by practice of the exemplary embodiments disclosed herein. The objects and advantages of the exemplary embodiments disclosed herein maybe realized and attained by means of the elements and combinations particularly pointed out in the appended claims. It is to be understood that both the foregoing summary and the following detailed description are exemplary and explanatory only and are not restrictive of the general inventive concepts as disclosed herein or as claimed.

DETAILED DESCRIPTION

Figure 1:
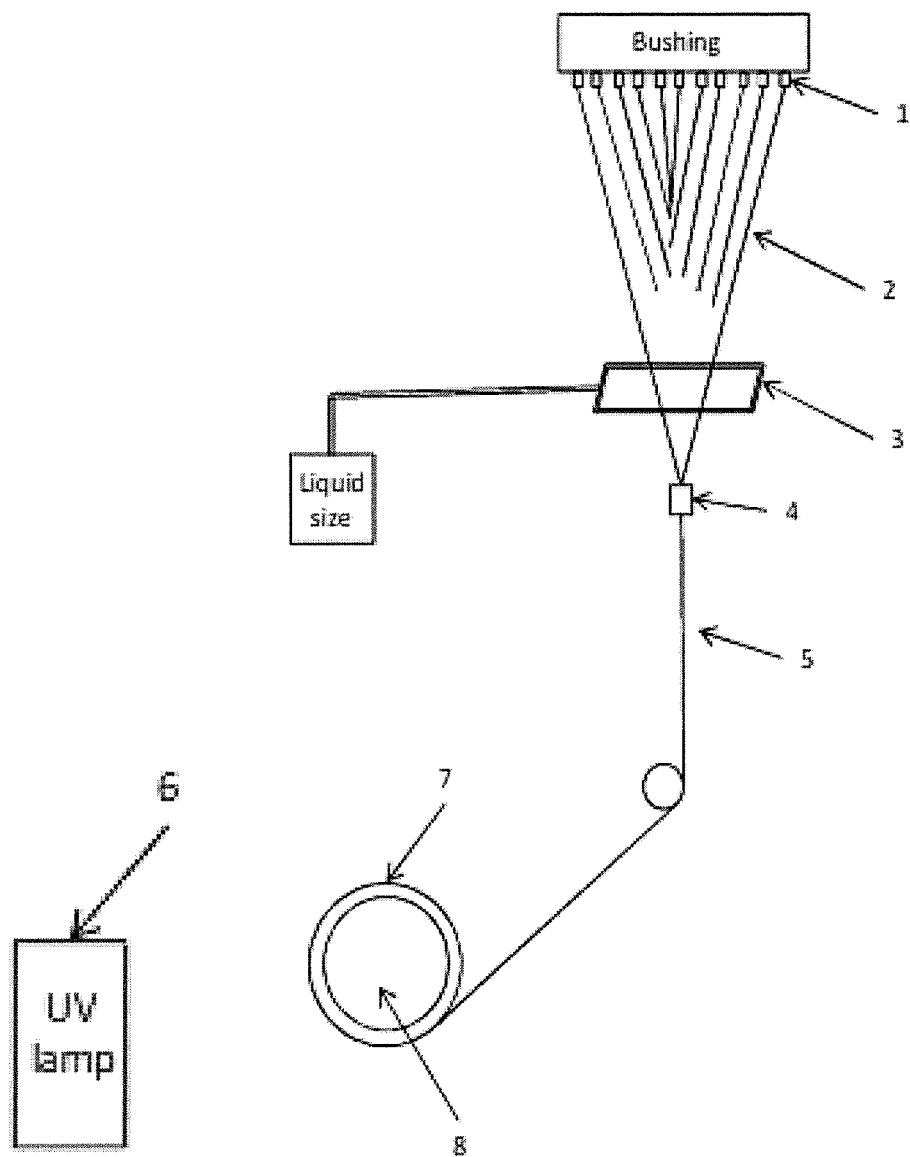
FIG. 1 illustrates an exemplary glass fiber sizing process including a UV lamp placed in proximity to a roving.

Various exemplary embodiments will now be described more fully, with occasional reference to any accompanying drawings. These exemplary embodiments may, however, be embodied in different forms and should not be construed as limited to the descriptions set forth herein. Rather, these exemplary embodiments are provided so that this disclosure will be thorough and complete, and will convey the general inventive concepts to those skilled in the art.

Unless otherwise defined, all technical and scientific terms used herein have the same meaning as commonly understood by one of ordinary skill in the art to which these exemplary embodiments belong. The terminology used in the description herein is for describing particular exemplary embodiments only and is not intended to be limiting of the exemplary embodiments.

As used in the specification and the appended claims, the singular forms "a," "an," and "the" are intended to include the plural forms as well, unless the context clearly indicates otherwise. All publications, patent applications, patents, and other references mentioned herein or otherwise cited are incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

As used herein, the term "fiber" is defined as a bundle of one or more monofilaments.

As used herein, the term "polymeric sizing" is defined as a sizing composition that includes polymerized monomers or oligomers.

As used herein, the term "impregnated" means either partially or fully coated with a composition, such as a sizing composition or a matrix material.

As used herein, the phrase "UV-cured" is defined as the polymerization of monomers or oligomers in presence of UV radiation.

As used herein, the term "polymer" includes the term "homopolymer" and "copolymer."

Unless otherwise indicated, the term "copolymer" refers to polymers made from any two or more different monomers including, for example, terpolymers, pentapolymers, homopolymers functionalized after polymerization so that two or more different functional groups are present in the product copolymer, block copolymers, segmented copolymers, graft copolymers, and any mixture or combination thereof.

Unless otherwise indicated, the term "oligomer" refers to polymers made from a few monomers, for example 2-10 monomers.

The general inventive concepts are directed to a UV-curable glass fiber sizing composition that includes a polyfunctional mercaptan, a polyunsaturated alkene, and a coupling agent.

In some exemplary embodiments, the glass fibers are formed or otherwise derived from silica-based glasses, borosilicate glasses such as E-glass, high-strength glasses such as S-glass; E-type glasses with lower amounts of boron or boron-free glasses, and E-CR glasses, (e.g., Advantex® available from Owens Corning). As used here, the term "boron/fluorine free" refers to glasses with substantially low amounts (including having none) of these two elements.

In some exemplary embodiments, the glass fiber used in connection with the UV-curable sizing composition is formed from a glass composition that includes 59.0 to 62.0 weight % $SiO_2$, 20.0 to 24.0 weight % CaO, 12.0 to 15.0 weight % $Al_2O_3$, 1.0 to 4.0 weight % MgO, 0.0 to 0.5 weight % $F_2$, 0.1 to 2.0 weight % $Na_2O$, 0.0 to 0.9 weight % $TiO_2$, 0.0 to 0.5 weight % $Fe_2O_3$, 0.0 to 2.0 weight % $K_2O$, and 0.0 to 0.5 weight % $SO_3$. For example, exemplary glass compositions include a $SiO_2$ content of about 60.1 weight %, a CaO content of about 22.1 weight %, an $Al_2O_3$ content of about 13.2 weight %, a MgO content of about 3.0 weight %, a K$_2$O content of about 0.2 weight %, a Na$_2$O content is about 0.6 weight %, a Fe$_2$O$_3$ content of about 0.2 weight %, a combined content of SO$_3$ and F$_2$ content of about 0.1 weight %, and a TiO$_2$ content of about 0.5 weight %.

The glass fiber may be in the form of individual filaments, twisted yarns, strands, or rovings. The glass fiber may be used in continuous or discontinuous form in the manufacture of fiber-reinforced composites.

Continuous fibers are fiber materials that are in the form of unbroken filaments, threads, strands, yarns, or rovings and may either be sized directly after formation in a continuous fiber-forming operation or may be formed and wound into packages that can be unwound at a later time to allow application of the sizing composition. Additionally, after unwinding, the continuous fibers may be or transformed into continuous fiber mats.

In contrast, discontinuous fibers are fiber materials that have been segmented by chopping or cutting, or which are otherwise formed from a process designed to form segmented fibers such as a fiber-forming spinner process. The segments of discontinuous fiber material that may be used in the present invention may have a generally uniform length, may be provided in a bimodal or other structured distribution of lengths, or may represent a more random distribution. The segments of the discontinuous fiber material may be provided in a range of lengths, typically ranging from about 2 mm to about 25 mm, although some applications may utilize longer fibers. The discontinuous fibers may then be transformed into mats, for example chopped strand mats.

In some exemplary embodiments, suitable mercaptans, such as R—S—H, thioalcohol, and thiol functional compounds are combined with various classes of unsaturated organic compounds ("enes") to form a thiol-ene system. The thiol may be a liquid, miscible with the unsaturated -ene oligomers and monomers of the present invention. In some exemplary embodiments, the thiol is at least di-functional in order to effect crosslinking. However, a certain amount of thiol monofunctional compounds may be added in order to influence the crosslinking depending on the application needs. Various exemplary embodiments include blends or mixtures of two or more distinct thiols.

Exemplary di-functional mercaptans include bis(3-mercaptopropionate, dimethyl bis(3-mercaptopropyl)silane, 1,6-hexanedithiol, 1,10-decanedithiol, and 3,6-Dioxaoctane-1,8-dithiol.

Exemplary tri-functional mercaptans include trimethylolpropane tris(trimercaptopropionate) [trimethylol propane (tris-mercaptopropionate, (TMPTMP)], and triethyl-1,3,5,-triazine-2,4,6-trione tris(3-mercaptopropionate).

Exemplary polyfunctional mercaptans include pentaerythritol tetrakis(3-mercaptopropionate); products of propylene glycol, butanediol, hexanediol, cyclohexanedimethanol, glycerol, polyethylene glycol, polypropylene glycol, or other glycols; polyester-polyols; and other compounds with multiple hydroxyl functionality, esterified with 3-mercaptopropionic acid.

Various other mercaptans may be used in the UV-curable sizing composition described herein, such as those described in WO 2004101649, the content of which is incorporated herein by reference in its entirety.

The mercaptans are generally included in the sizing composition at a concentration of about 20 weight % to about 80 weight % of the sizing composition. In some exemplary embodiments, the mercaptans are used in an amount of from about 30 weight % to about 75 weight % of the sizing composition. In other exemplary embodiments, the amount is between about 40 weight % to about 70 weight % of the sizing composition.

Polyunsaturated alkenes are molecules having two or more "ene" groups, meaning two or more unsaturated bonds. A wide range of classes of polyunsaturated alkenes is suitable for purposes of the present invention. Generally, any ene-terminated monomer or oligomer may be used for purposes of the present invention molecules as long as it has two or more "ene" groups. However, a certain amount of alkene monofunctional compounds may be added in order to influence the crosslinking depending on the application needs.

In some exemplary embodiments, the polyunsaturated alkene monomer includes one or more of vinyl ether, allyltriazine, and acrylate alkene.

In some exemplary embodiments, the polyunsaturated alkene agent is included in the sizing composition at a concentration of about 5 weight % to about 60 weight % of the sizing composition. Preferably, the polyunsaturated alkene agent is used in an amount of from about 7.5 weight % to about 50 weight % of the sizing composition, or from about 10 weight % to about 35 weight % of the sizing composition.

Different thiol-ene systems may be used that allow for high polymerization rates. High conversion degrees may be obtained for compositions close to a stoichiometric ratio. However, for certain applications, it may be preferable to have free remaining thiol or alkene functions. In some exemplary embodiments, the thiol-ene system is a thiol-acrylate system; a combination of vinyl ether monomers and tetra functional thio co-monomer; a thiol-allyl triazine; a combination of thiol, acrylate, and vinyl ether monomers or oligomers preferably comprising two to ten monomers; or combinations thereof. In some exemplary embodiments, the thiol-ene system is an association of tetrathiols, preferably pentaerythritol tetrakis(3)-mercaptopropionate, with alkene monomers, such as vinyl ether, allyltriazine, and acrylate alkene being suitable monomers.

A coupling agent is a composition that ensures bonding between the glass fiber and the matrix polymer. In some exemplary embodiments, the coupling agent is a silicon-, zirconium-, titanium- and aluminum-based coupling agent. In some exemplary embodiments, the coupling agent is a silane coupling agent.

The coupling agent may be represented by the general formula $X_n$-M-$Y_{4-n}$, where M is silicon-, zirconium-, titanium- or aluminum, X is a functional organic group of the general formula —(CH$_2$)$_m$—R, where m may be in the range 1 to 6 and R may be —NH$_2$, —OCO—CH(CH$_3$)=CH$_2$, —OCO—CH$_2$=CH$_2$, —O—CH$_2$=CH$_2$, —CH$_2$=CH$_2$, —SH, —S$_2$—, —S$_4$—, —NH—(CH$_2$)—NH$_2$, (NH+—(Cl—)-φ), glycidyl ether, Y is a fiber reactive group, and n may be 1, 2 or 3. In some exemplary embodiments, Y is an alkoxy that may be hydrolyzed to form a hydroxyl group and X is an alkyl glycidyl or methacryloxy group. In some exemplary embodiments, the coupling agent is a silane that comprises an alkyl glycidyl-based silane.

Exemplary alkyl glycidyl-based silanes include, but are not limited to, vinyltrimethoxysilane (commercially available as A-171), glycidyloxypropyltrimethoxysilane (commercially available as A-187), and methacryloxypropyltrimethoxysilane (commercially available as A-174), all of which are available from GE Osi Specialties, Inc. In some exemplary embodiments, the coupling agent includes one or more of γ-aminopropyltriethoxysilane, polysilazane, γ-glycidoxypropyltrimethoxysilane, and γ-methacryloyloxypropyltrimethoxysilane.

The UV-curable sizing composition may contains one or more coupling agents. In some exemplary embodiments, the sizing composition contains a mixture of two coupling agents, such as a mixture of -aminopropyltriethoxysilane and polysilazane or a mixture of γ-glycidoxypropyltrimethoxysilane and γ-methacryloyloxypropyltrimethoxysilane.

In some exemplary embodiments, a coupling agent is included in the UV-curable sizing composition at a concentration of about 0.05 weight % to about 40 weight % of the sizing composition, or from about 0.2 weight % to about 35 weight %, or from about 1 weight % to about 30 weight % of the UV-curable sizing composition.

In some exemplary embodiments, the UV-curable sizing composition is formed by mixing a suitable polyfunctional alkene monomer with a polyfunctional mercaptan at a functional group ratio within 5% of stoichiometric. In some exemplary embodiments, the polyfunctional alkene monomer and polyfunctional mercaptan are mixed at an equivalent functional group stoichiometry. However, any polyfunctional alkene monomer/polyfunctional mercaptan ratio is acceptable so long as the final product retains suitable performance.

The UV-based sizing composition may also include additives, such as an emulsifier, a base; and other conventional additives such as photoinitiators, wetting agents, lubricants, color enhancing or compensating reagents, viscosity modifiers, stabilizers, acids and other bases.

In some exemplary embodiments, the UV-curable sizing composition includes a photoinitiator, such as 2,4,6-trimethylbenzoyldiphenylphosphineoxide, 2,4,6-trimethylbenzophenone, 2-hydroxy-2-methyl-1-phenyl-1-propanone, alpha-hydroxycyclohexylphenylketone, benzophenone, benzyldimethylketone, isopropylthioxanthone, ethyl-4-dimethylaminobenzoate, oligo[2-hydroxy-2-methyl-1-[4-(1-methylvinyl)phenyl]propanone], 1-[4-(4-benzoylphenylsulfanyl)phenyl]-2-methyl-2-(4-methylphenylsulfonyl)propan-1-one.

The photoinitiator may be present in the UV-curable sizing composition in an amount less than 7.5 weight %, such as less than 6.0 weight %, or in an amount from about 0.25 weight % to about 4.5 weight %.

In some exemplary embodiments, the UV-curable sizing composition includes one or more lubricants, such as (alkoxylated) alkyl esters, (alkoxylated) alkyl alcohol, (alkoxylated) fatty amines, petroleum distillates, and mixtures thereof. Lubricants may be present in the sizing composition of the present invention in an amount less than 15 weight %, or less than 10 weight %, such as in an amount from about 1 weight % to about 8 weight %.

In some exemplary embodiments, the UV-curable sizing composition includes one or more stabilizers, such as 4-tert-butyl-catechol (TBC), butylated hydroxytoluene (BHT), 2,5-diethyl-2,5-dimethylimidazolidin-4one-1-oxyl (NO-67), and hydroquinone (HQ). Stabilizers may be present in the sizing composition of the present invention in an amount less than 5 weight %, or less than 2 weight %, such as in an amount from about 0.25 weight % to about 1.5 weight %.

In some exemplary embodiments, the UV-curable sizing composition coats one or more glass fibers such that at least 95 weight % of the sized glass fiber is glass. In other exemplary embodiments, at least 98 weight % of the sized glass fiber is glass, or at least 99 weight %, based on the total weight of the glass fibers. Accordingly, exemplary sized glass fibers include less than 5 weight % of the UV-curable sizing composition, or less than 2 weight %. In some exemplary embodiments, the sized glass fibers include less than 1 weight % of the UV-curable sizing composition, based on the total weight of the glass fibers. The UV-curable sizing composition may be applied, for example, to continuous filaments of a reinforcing fiber material immediately after they are formed in an in-line or direct operation, that is, as part of the filament formation process. Alternatively, the UV-curable sizing composition may be applied off-line to unwound strands of reinforcing fiber material that were previously formed and packaged. The strands may be cut or chopped in an off-line process.

Means for applying the UV-curable sizing composition include, but are not limited to, pads, sprayers, rollers, or immersion baths, which allow a substantial amount of the surfaces of the filaments of the reinforcing fiber material to be wetted with the sizing composition, as described, for example, in FR 2767539 and FR 2798125, the disclosure of which are both fully incorporated herein by reference.

In some exemplary embodiments, the UV-curable sizing composition is applied to a plurality of continuously forming filaments of a reinforcing fiber material as soon as they are formed from a fiber-forming apparatus, such as a bushing. The bushing may be equipped with small apertures and related structures (e.g., bushing tips) to allow passage of thin streams of a molten reinforcing fiber material. As the streams of molten material emerge from the bushing apertures, each stream is attenuated and pulled downward to form a long, continuous filament. The UV-curable sizing composition is then applied to the filaments, such as by spraying the composition onto the forming filaments. The UV-curable sizing composition may be directly applied to the surface of the fibers, such that the fibers are thoroughly coated with the sizing composition. After the filament formation process, the continuously forming filaments may then be gathered into fiber strands and chopped or cut in an in-line operation, or they may be gathered into fiber strands for winding into forming packages or doffs after which they may be optionally chopped in an off-line operation.

Figure 2:
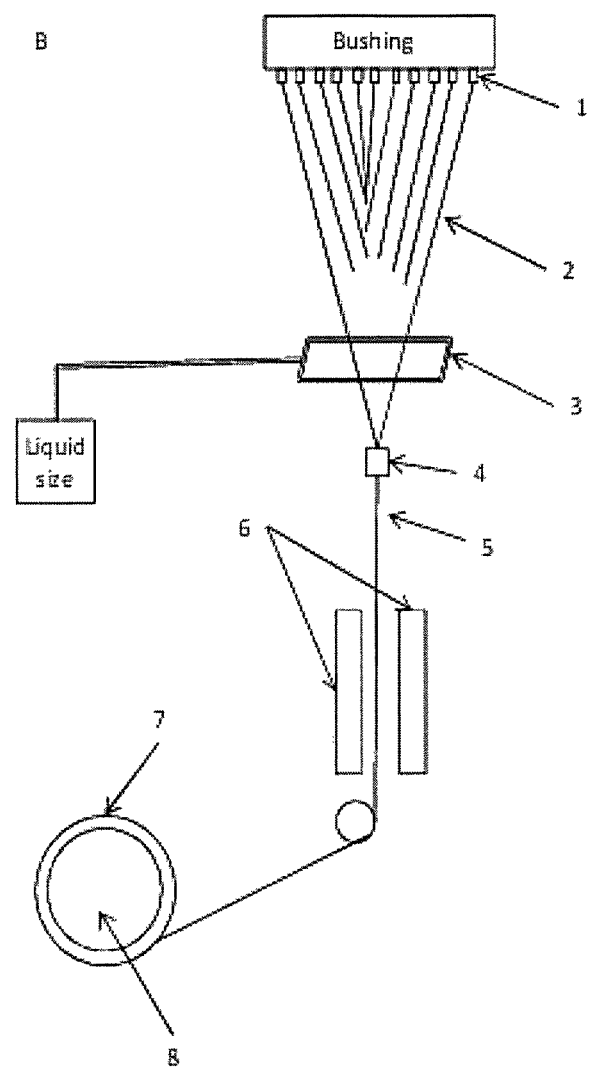
FIG. 2 illustrates an exemplary glass fiber sizing process including a UV lamp that irradiates the glass fiber is placed before a winding step.

FIGS. 1 and 2 illustrate exemplary embodiments of a sized fiber formation process. The filaments (2) leave the bushing tips (1) and pass by the size applicator (3). The UV-curable sizing composition is applied by the size applicator (3). The filaments are then assembled at the gathering point (4) to form the fiber strand (5).

The UV source (6), such as a UV lamp, may be arranged in a wide variety of suitable points in the fiber formation process once the UV-curable sizing composition has been applied, but prior to the winding process. In some exemplary embodiments, such as that illustrated in FIG. 1, the UV source (6) is arranged in close proximity to the winder such that the UV-curable sizing composition (7) may be irradiated several times as the fiber is being wound on a bobbin (8), until the fiber is totally covered by other fibers. In other exemplary embodiments, such as that illustrated in FIG. 2, the UV source (6) is arranged between the sizing applicator (3) and the winding step, including the bobbin (8).

The placement of the UV source (6) over the rotating winder provides increased irradiation exposure time, as compared with placing the UV source directly after the sizing application, which provides only a single opportunity for irritation exposure. In some exemplary embodiments, placing the UV source over the winder increases the UV irradiation time to about 0.5 seconds, as opposed to about 0.015 seconds, when the UV source is placed directly after the sizing application.

Other sources of radiation, e.g., exposure by VIS light or electron beam (EB) radiation can also be used to allow for step growth polymerization according to the present invention.

The UV-cured sized fibers may be used to form reinforced composites. In some exemplary embodiments, the reinforced composites include UV-cured sized fibers and a resin material. According to some exemplary embodiments, the UV-cured sized fibers include at least 95 weight % of glass fibers, or at least 98 weight % of glass fibers, such as about 99 weight % of glass fibers, based on the total weight of the UV-cured sized fibers. In some exemplary embodiments, the reinforced composites include no more than 5 weight % of UV-cured sizing composition, or no more than 2 weight % of UV-cured sizing composition, such about 1 weight % or less of the UV-cured sizing composition, based on the total weight of the UV-cured sized fibers.

The reinforced composites further include a resin material. Exemplary resin materials include thermoplastic polymers and thermoset polymers, including, but not limited to, polyolefins, modified polyolefins, saturated or unsaturated polyesters, polyacetals, polyamides, polyacrylamides, polyimides, polyethers, polyvinylethers, polystyrenes, polyepoxides, polycarbonates, polysiloxanes, polysulfones, polyanhydrides, polyiminesepoxies, polyacrylics, polyvinylesters, polyurethanes, maleic resins, urea resins, melamine resins, phenol resins, furan resins polymer blends, and mixtures thereof.

The process of compounding and molding the glass fibers sized with the UV-cured composition and the resin material to form a composite may be accomplished by any suitable means conventionally known in the art. Such compounding and molding means include, but are not limited to, extrusion, wire coating, compression molding, injection molding, extrusion-compression molding, extrusion-injection-compression molding, long fiber injection, pultrusion, and pushtrusion. These techniques in general are applicable to thermoplastics. Techniques applicable to thermoset applications include, but are not limited to filament winding, infusion, and resin transfer molding (RTM).

In some exemplary embodiments, the amount of resin material included in the reinforced composite is about 5 weight % to about 95 weight %, based on the total weight of the reinforced composite. In other exemplary embodiments, the percent composition of resin material is between about 10 weight % and about 85 weight %, or from about 20 weight % to about 70 weight %, based on the total weight of the reinforced composite.

The UV-curable sizing compositions allow for fiber impregnation at the nanometer scale in a non-aqueous and solvent-free system, such that no separate drying step is required. Due to the lack of a drying step, the problems seen with migration are avoided. Moreover, the UV-curable sizing compositions of the present invention are not inhibited by oxygen and show surprisingly good performance in composite materials. Furthermore, the present invention confers economic and environmental advantages because no solvents, processing additives, or exogenous photoinitiators are required. However, photoinitiators may optionally be added to the sizing composition of the present invention in order to increase the polymerization rate.

The general inventive concepts have been described above both generically and with regard to various exemplary embodiments. Although the general inventive concepts have been set forth in what is believed to be exemplary illustrative embodiments, a wide variety of alternatives known to those of skill in the art can be selected within and are encompassed by the disclosure. The general inventive concepts are not otherwise limited, except for the recitation of the claims set forth below. As will be appreciated by those skilled in the art, the sizing compositions, sized fibers, and composite materials incorporating such fibers according to the present invention may be practiced in a variety of embodiments and methods not explicitly disclosed herein by modifying the basic compositions and methods in accord with the principles outlined herein. In particular, the concentrations and constituents of the various examples provided below may be combined and altered within the general compositional parameters to provide a large variety of size compositions in accord with the present invention. Thus, the following examples are meant to better illustrate the present invention, but are in no way intended to limit the general inventive concepts of the present invention.

EXAMPLES

The Following examples describe the performance of various exemplary embodiments of the UV-curable sizing composition, UV-cured sized fibers, and reinforced composites of the present invention.

Sizing Compositions.

Table 1 shows exemplary embodiments of the sizing compositions of the present invention.

TABLE 1

| UV-Curable Sizing Compositions (weight %) | | | | | |
| --- | --- | --- | --- | --- | --- |
| Function | Chemical name or class | Ex 1 | Ex 2 | Ex 3 | Ex 4 |
| Alkene | Propargyl Acrylate | | | | 13 |
| Alkene | Triethyleneglycol divinyl ether | 36 | | | 10 |
| Mercaptan | Pentaerythritol | 42.5 | 46 | 46 | 55 |
| Alkene | 1,3,5-Triallyl-1,3,5-triazine-2,4,6(1H,3H,5H)-trione | | | 32.5 | |
| Alkene | Cyclohexanedimethanoldivinylether | | 32.5 | | |
| Photoinitiator | α-hydroxy-cyclohexyl-phenyl-ketone | 1 | 1 | 1 | 1 |
| Coupling agent | γ-aminopropyltriethoxysilane | 10 | | | |
| Coupling agent | Polysilazane in 50 weight % of methanol | 5 | | | |
| Coupling agent | γ-glycidoxypropyltrimethoxysilane | | 10 | 10 | 10 |
| Coupling agent | γ-methacryloyloxypropyltrimethoxysilane | | 5 | 5 | 5 |
| Lubricant | Ethoxylated fatty amines and petroleum distillates | 5 | 5 | 5 | 5 |
| Stabilizer | Hydroquinone | 0.5 | 0.5 | 0.5 | 1 |

Performance of the UV-curable Sizing Compositions

Table 2 shows the performance of glass fibers sized with the non-aqueous UV-curable sizing composition of Examples 1 to 4 illustrated in Table 1, as compared to traditional rovings manufactured using an aqueous sizing composition (Reference 2). The conditions were 23° C. and 50% humidity during seven days. The resin material was epoxy LY 564/anhydride HY 917.

TABLE 2

UV-Curable Sizing Performance

| Example No | 1 | 2 | 3 | 4 | Reference(2) |
|---|---|---|---|---|---|
| Flexural Properties (1) | | | | | |
| Stress (Mpa) | 1430 | 1410 | 1375 | 1440 | 1330 |
| Stress 100% glass (Mpa) | 2325 | 2525 | 2460 | 2470 | 2200 |
| Modulus (MPa) | 45900 | 43600 | 42600 | 43500 | 46700 |
| Flexural strain (%) | 3.05 | 3.15 | 3.15 | 3.15 | 3 |
| Traction sens L (ISO 572-5) | | | | | |
| Stress (Mpa) | 1310 | 1540 | 1230 | 1350 | 1040 |
| Modulus (Mpa) | 48100 | 46600 | 47000 | 45100 | 47800 |
| Flexion T | | | | | |
| Stress (Mpa) | 79.5 | 102 | 97.2 | 90.3 | 94.2 |
| Modulus (Mpa) | 10950 | 13000 | 11600 | 11800 | 11700 |
| Flexural strain (%) | 0.79 | 0.79 | 0.81 | 0.78 | 0.84 |
| Shear (ISO 14130: 1997) | | | | | |
| Corrected stress Mpa | 68.3 | 92.8 | 83.1 | 85.2 | 61.2 |
| Glass fiber volume weight % | 59.99 | 54.06 | 54.03 | 56.47 | 58.86 |

(1) L direction (ISO 14125 Class III, method A)
(2) SE 1500 roving commercially available from Owens Corning. This roving is manufactured using an aqueous, waterborne sizing composition and the water is removed by a subsequent drying step

The invention claimed is:

1. A UV-curable glass fiber sizing composition comprising:
   a. a polyfunctional mercaptan;
   b. a polyunsaturated alkene, wherein monomers of the polyunsaturated alkene include at least one of an allyltriazine and an acrylate alkene; and
   c. a coupling agent.

2. The UV-curable sizing composition of claim 1, wherein the polyfunctional mercaptan is a tetrathiol.

3. The UV-curable sizing composition of claim 1, wherein the coupling agent is one of a silicon-, zirconium-, titanium-, and aluminum based coupling agent.

4. The UV-curable sizing composition of claim 1, wherein the coupling agent is a silane-based coupling agent.

5. The UV-curable sizing composition of claim 4, wherein the silane based coupling agent is one of a γ-aminopropyltriethoxysilane, a polysilazane, a γ-glycidoxypropyltrimethoxysilane, or a γ-methacryloyloxypropyltrimethoxysilane.

6. The UV-curable sizing composition of claim 1, wherein the polyfunctional mercaptan is from about 20 weight % to about 80 weight % of said sizing composition.

7. The UV-curable sizing composition of claim 1, wherein polyunsaturated alkene is from about 5 weight % to about 60 weight % of the sizing composition.

8. The UV-curable sizing composition of claim 1, wherein said coupling agent is present in an amount from about 0.05 to 40 weight % of said sizing composition.

9. A method of sizing glass fibers with a UV-curable sizing composition, the method comprising:
   a. preparing the UV-curable sizing composition of claim 1;
   b. applying the UV-curable sizing composition to a surface of the glass fibers to form a coated surface; and
   c. exposing the coated surface to UV radiation to cure the UV-curable sizing composition.

10. The method of claim 9, wherein the sizing composition is applied after the glass fibers are formed.

11. The method of claim 9, wherein the coated surface is exposed to UV radiation during a winding process.

12. A reinforced composite, comprising:
at least one glass fiber sized with the UV-curable sizing composition of claim 1; and
a resin material.

13. The reinforced composite of claim 12, wherein the resin material is an epoxy resin.

14. A glass fiber sized with a UV curable sizing composition comprising:
   a. at least 95 or more weight % glass; and
   b. no more than 5 weight % of a UV-curable sizing composition, comprising:
      i. a polyfunctional mercaptan;
      ii. a polyunsaturated alkene, wherein monomers of the polyunsaturated alkene include at least one of an allyltriazine and an acrylate alkene; and
      iii. a coupling agent.

15. The glass fiber of claim 14, wherein said polyfunctional mercaptan is a tetrathiol.

16. The glass fiber of claim 14, wherein said coupling agent is one of a silicon-, zirconium-, titanium- and aluminum-based coupling agent.

17. The glass fiber of claim 14, wherein said coupling agent is a silane-based coupling agent.

18. The glass fiber of claim 17, wherein the silane-based coupling agent is one of a γ-aminopropyltriethoxysilane, a polysilazane, a γ-glycidoxypropyltrimethoxysilane or a γ-methacryloyloxypropyltrimethoxysilane.

19. The glass fiber of claim 14, wherein the polyfunctional mercaptan is from about 20 weight % to about 80 weight % of the sizing composition.

20. The glass fiber of claim 14, wherein the polyunsaturated alkene is from about 5 weight % to about 60 weight % of the sizing composition.

21. The glass fiber of claim 14, wherein the coupling agent is from about 0.05 weight % to about 40 weight % of the sizing composition.

* * * * *